US008820758B2

(12) United States Patent
Schwinn et al.

(10) Patent No.: US 8,820,758 B2
(45) Date of Patent: Sep. 2, 2014

(54) ADDITIONAL AXLE FOR AGRICULTURAL MACHINE WEIGHT REDISTRIBUTION

(75) Inventors: Kevin S. Schwinn, Orion, IL (US); John Donald Watt, Davenport, IA (US); Tracy R. Archer, Monett, MO (US)

(73) Assignee: CNH Industrial America LLC, New Holland, PA (US)

( * ) Notice: Subject to any disclaimer, the term of this patent is extended or adjusted under 35 U.S.C. 154(b) by 61 days.

(21) Appl. No.: 13/218,059

(22) Filed: Aug. 25, 2011

(65) Prior Publication Data

US 2013/0049316 A1 Feb. 28, 2013

(51) Int. Cl.
*B62D 61/12* (2006.01)

(52) U.S. Cl.
CPC .................................... *B62D 61/12* (2013.01)
USPC ............................ 280/86.5; 180/209; 56/14.7

(58) Field of Classification Search
USPC ........... 280/86.5, 758–760, 767; 180/209, 22, 180/24.02; 56/14.7
See application file for complete search history.

(56) References Cited

U.S. PATENT DOCUMENTS

| 3,161,418 A | 12/1964 | Brennan et al. |
| 3,191,963 A | 6/1965 | Prichard |
| 3,542,135 A * | 11/1970 | McCanse ....................... 172/319 |
| 3,912,293 A | 10/1975 | Harbers |
| 4,063,475 A | 12/1977 | Perkins |
| 4,848,783 A | 7/1989 | Christenson et al. |
| 5,339,611 A | 8/1994 | Roderfeld et al. |
| 6,116,698 A | 9/2000 | Smith et al. |
| 6,478,317 B2 | 11/2002 | Konop |
| 6,585,071 B2 | 7/2003 | Meurer |
| 7,197,864 B2 | 4/2007 | Josset et al. |
| 7,527,118 B2 | 5/2009 | Bushinski |
| 2004/0187461 A1* | 9/2004 | Rickert .......................... 56/14.2 |
| 2009/0205885 A1* | 8/2009 | Strong ....................... 180/24.02 |
| 2010/0201092 A1 | 8/2010 | Pompa et al. |

FOREIGN PATENT DOCUMENTS

DE 10240236 3/2004

* cited by examiner

*Primary Examiner* — Ruth Ilan
(74) *Attorney, Agent, or Firm* — Patrick M. Sheldrake; Seyed V. Sharifi T.

(57) ABSTRACT

A tag axle assembly for an agricultural machine, such as a harvester, and method for redistributing weight of the harvester from the rear axle of the harvester when a header is removed, or when replaced by a lighter header, at the front of the harvester. The tag axle assembly includes a tag axle with tires that may be lowered so that the tires contact the ground when no header is attached to the machine to absorb loads transferred from the front of the harvester to the rear axle and rear tires at the rear of the harvester. The tag axle and tires may be raised up from the ground, or the tag axle assembly may be removed from the harvester, when a header is attached to the front of the harvester causing redistribution of load from off the rear axle and rear tires.

11 Claims, 12 Drawing Sheets

ADDITIONAL AXLE FOR AGRICULTURAL MACHINE WEIGHT REDISTRIBUTION

TECHNOLOGY FIELD

The present disclosure relates generally to an additional axle on an agricultural machine, such as combine harvester, for weight redistribution.

BACKGROUND

Agricultural machines include both combine and forage harvesters. The combine harvester, or simply combine, is a machine that harvests, threshes, and cleans grain plants. The forage harvester harvests forage plants to make silage. Some combines utilize shakers to separate the grain from the chaff and straw-walkers to eject the straw while retaining the grain. Over time, harvesters have enlarged including larger manufactured components, such as headers and tires. Larger harvesters cut larger areas of crops and/or store more grain.

Today's combines and forage harvesters are equipped with removable heads, or headers, designed for particular crops. The header is mounted to the front of the harvester for harvest. The header can be removed from the harvester, so that the harvester may be driven on roads, wherein the harvester without the header may form a narrower configuration to fit within the width of the road or a lane in the road. When a header is attached to the front of a combine, the weight of the header applies a moment acting about the harvester's front axle. This moment acts to lessen the amount of harvester weight carried by the rear axle. In many harvesters the rear wheels and rear axle serve to steer the harvester. When the header is mounted to the front of the harvester, it is necessary to have a sufficient amount of the harvester weight applied on the rear axle so that the harvester remains stable for directional control, for rear wheel traction if the harvester has a power guide axle, and to prevent the harvester from tipping forward causing the header to contact the ground and introduce undesirable impact or damage to the header and/or harvester. Often it is necessary to counteract the moment caused by header weight by adding weight to the rear of the harvester, which may include suitcase weights added on the rear axle, weights added directly to the rear wheels, or fluid (e.g. calcium chloride) introduced into the rear or steer tires.

The addition of various types of weights at the rear of the harvester results in a heavier harvester. A heavier harvester introduces undesirable results including: increased soil compaction; an inability to harvest during muddy conditions; and necessity to design stronger and thus often more costly harvester components to absorb the increased loads. As harvesters get larger and heavier, more weight must be added to the rear of the harvester to offset load. Often the weight added to the rear needs to be variable, because some harvester operators drive with larger header attachments than other operators using the same harvester model.

When the header is removed, much of the added weight is transferred to the rear axle. When the weight on the rear axle becomes excessive, the rear axle and associated support structure become susceptible to failure. Load bearing on the rear axle is becoming more of a concern with larger harvesters and the additional weight added to the rear wheels. However, a harvester may only operate without a header for a short period of time, so redesigning the components in or around the steering rear wheels for load absorption is cost inefficient.

What is needed is a device for an agricultural machine, or harvester, that may be configured to remove weight and offset loading on the rear axle when the header is either replaced with a lighter header or removed entirely from the front of the machine. This would minimize the possibility of structural failure and/or damage to the machine.

SUMMARY

Embodiments of the present invention provide an additional axle, or tag axle, and method for utilizing the tag axle to provide for a redistribution of weight and offset loading on the rear axle of a harvester when the harvester header is either replaced with a lighter header or removed entirely.

Embodiments of the present invention are directed to a harvester comprising a feeder connected at approximately a front end of the harvester. The feeder includes a connection point for a header to attach The harvester further includes at least one pair of front wheels. Each front wheel of the at least one pair are connected to opposing ends of a front axle for supporting loads about the front end of the harvester with the front wheels in contact with a ground surface. The harvester further includes at least one pair of rear wheels. Each rear wheel of the at least one pair are connected to opposing ends of a rear axle for supporting loads about a rear end of the harvester with the rear wheels in contact with the ground surface. The harvester further includes a tag axle assembly. The tag axle assembly includes one or more rigid members connected approximately near to the rear end of the harvester. The tag axle assembly further includes a tag axle connected to the one or more rigid members. The tag axle assembly further includes one or more tag tires connected about the tag axle to rotate in connection with the tag axle. The one or more tag tires contact the ground surface to support loads about the rear end of the harvester when the header is not attached at the connection point with the feeder.

According to one embodiment of the invention, the tag axle assembly further includes a pivot rod connected to the one or more rigid members wherein the pivot rod is free to rotate within the connection to the one or more rigid members. The tag axle assembly further includes one or more pivot members connected to the pivot rod and to the tag axle, replacing the tag axle connection to the one or more rigid members. The pivot members rotate from the connection with the pivot rod in the direction of rotation of the pivot rod. The tag axle assembly further includes one or more actuating cylinders connected at one end to a control device in the harvester for controlling extension and retraction of the one or more actuating cylinders and connected at another end to the tag axle. When the one or more actuating cylinders are retracted, the one more actuating cylinders pull the tag axle away from the ground surface with the one or more pivot members rotating in direction of the pivot rod to allow for the tag axle to raise up and wherein when the one or more actuating cylinders are extended, the one or more actuating cylinders push the tag axle towards the ground surface with the one or more pivot members rotating in opposite direction with the pivot rod to allow for the tag axle to lower down.

According to one aspect of one embodiment of the invention, the one or more actuating cylinders are selected from a hydraulic actuator, an electro-mechanical actuator, a mechanical actuator, or a pneumatic actuator. According to another aspect of one embodiment of the invention, the one or more actuating cylinders are retracted to pull up the tag axle into a position for storage about the rear of the harvester.

According to another embodiment of the invention, the tag axle assembly further comprises a tie rod connected between two or more tag tires so that the two or more tag tires caster in the direction of travel of the harvester.

According to another embodiment of the invention, the one or more tag tires contact the ground surface to support loads about the rear end of the harvester when a light weight header is attached at the connection point with the feeder.

According to another embodiment of the invention, the tag axle assembly further includes one or more additional tag axles having one or more additional tag tires connected thereon. A first additional tag axle is connected to the tag axle by an extension rod and each successive additional tag axle is connected to the previous additional tag axle by an extension rod. Each additional tag axle is positioned in parallel to the tag axle and the one or more additional tag tires further absorb loads at the rear end of the harvester.

According to another embodiment of the invention, the one or more tag tires include a larger diameter tire to absorb additional loads at the rear end of the harvester.

According to another embodiment of the invention, the one or more tag tires comprise larger widths for a larger tire surface area to absorb additional loads at the rear end of the harvester.

According to another embodiment of the invention, the control device is located in a cabin of the harvester. The control device is selected from a lever, button, switch, or touch display to extend and retract the one or more actuating cylinders.

According to another embodiment of the invention, the tag axle comprises one or more ballasts to add weight to the tax axle assembly.

Embodiments of the present invention are directed to method for redistributing a weight from the rear of a harvester including retracting one or more actuating cylinders by commanding a control device connected to one end of the one or more actuating cylinders. Another end of the one or more actuating cylinders is connected to a tag axle to store the tag axle about a rear end of a harvester when a header is attached to a front end of the harvester. The tag axle is connected to one or more tag tires and the one or more tag tires are not in contact with a ground surface. The one or more tag tires are connected about the tag axle to rotate about connection with the tag axle. The tag axle is connected to one or more pivot members connected to a pivot rod wherein the pivot members rotate about the connection at the pivot rod in the direction of rotation of the pivot rod and wherein the pivot rod is connected to one or more rigid members. The pivot rod is free to rotate within the connection to the one or more rigid members which are connected to the rear end of the harvester. The method further includes extending the one or more actuating cylinders by commanding the control device to lower the tag axle, connected to the one or more pivot members rotating with the pivot rod, until the tag tires contact the surface of the ground. The method further includes removing the header from the front end of the harvester to allow for loads to transfer from at least one pair of front wheels connected to a front axle for supporting loads about the front end of the harvester to at least one pair of rear wheels connected to a rear axle for supporting loads about the rear end of the harvester and to the tag tires in contact with the surface of the ground to further support loads about the rear end of the harvester.

According to one embodiment of the invention, the method further includes adding ballasts to the tag axle before removing the header.

According to one embodiment of the invention, the method further includes adding a light weight header to the front end of the harvester after removing the header. The light weight header is lighter in weight than the header.

According to one embodiment of the invention, the method further includes reattaching the header to the front end of the harvester after removing the header and retracting one or more actuating cylinders by commanding the control device to raise the tag axle to a position of storage about the rear end of the harvester.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The problems in the prior art have motivated the creation of a tag axle assembly for the redistribution of weight and offset loading from a rear axle of a harvester to the tag tires in the tag axle assembly when a harvester header is either removed entirely or replaced with a lighter header.

Figure 1:
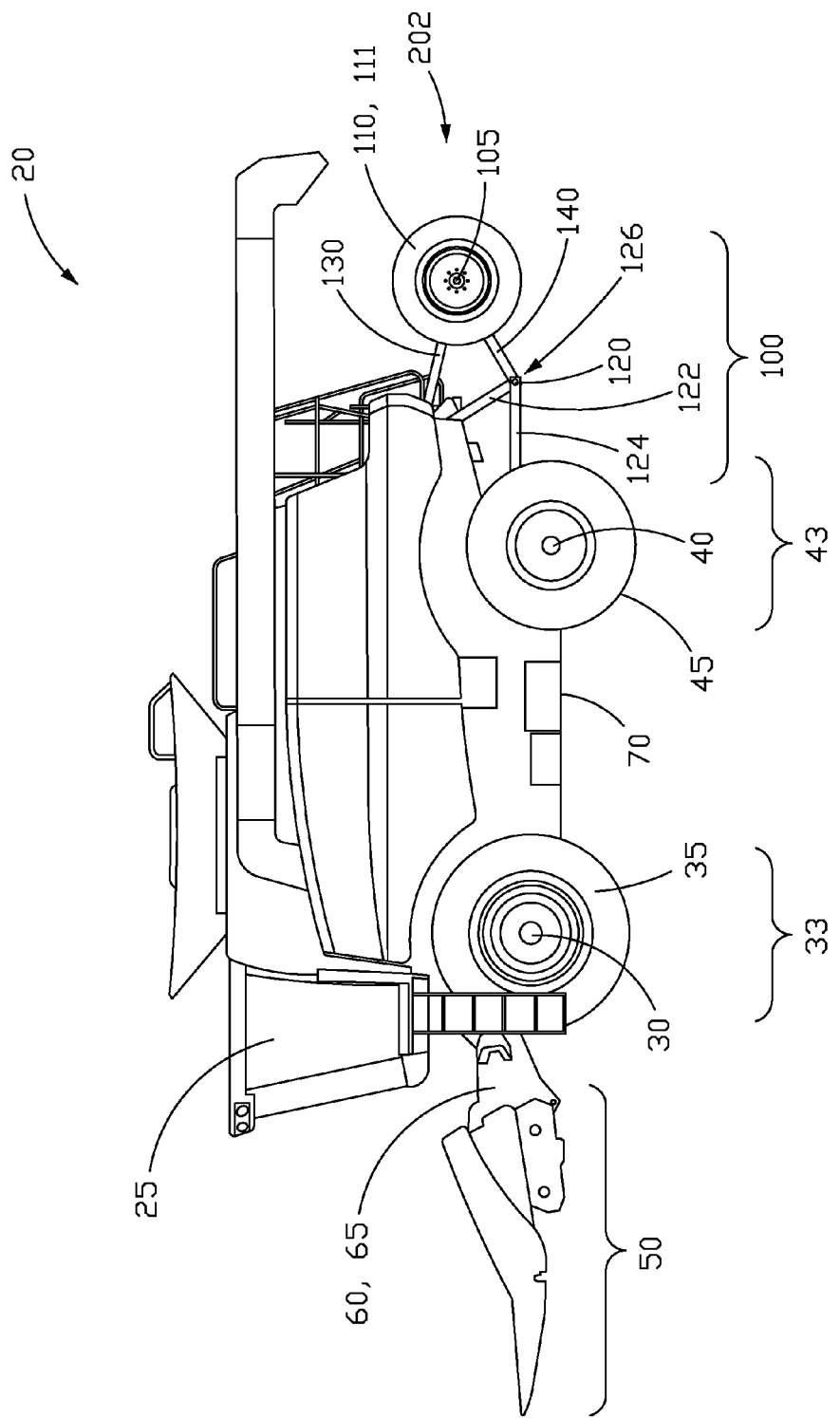
FIG. 1 illustrates a side view of a harvester with an attached header and an integrated tag axle assembly with tag tires positioned off the ground according to one embodiment of the present invention.

FIG. 1 illustrates a side view of a harvester 20 with an attached header 50 and an integrated tag axle assembly 100 with tag tires 111 positioned off the ground according to one embodiment of the present invention. The harvester 20 is supported above the ground on one or more pair of front wheels 33 and one or more pair of rear wheels 43. As shown in FIG. 1, tires wrap around both the front wheels 33 and rear wheels 43. A front axle 30 runs through the one or more pair of front wheels 33. As shown in FIG. 1, ends of the front axle 30 are centered about connection in front wheels 33, through left front tires 35 and right front tires (not shown). As shown in FIG. 1, the front axle 30, and front wheels 33 connected to the axle, are located approximately under the cab 25 and behind header 50. The front wheels 33 may drive the harvester 20 in a forward or rearward direction as commanded by the operator in cabin 25. By driving the harvester 20, the front wheels 33 and front axle 30 may supply power to other various components in the harvester 20. Rear axle 40 runs along the width of the harvester 20 between one or more pair of rear wheels 43. End of rear axle 40 is shown extending centrally through rear wheels 43, as within left rear tire 45 and right rear tire (not shown). Rear wheels 43 are located approximately near the rear of the harvester opposite the end of the harvester 20 having header 50 attached. The rear wheels 43 may steer the harvester 20, thus turning the harvester 20 left or right as commanded by the operator in cabin 25.

Figure 2:
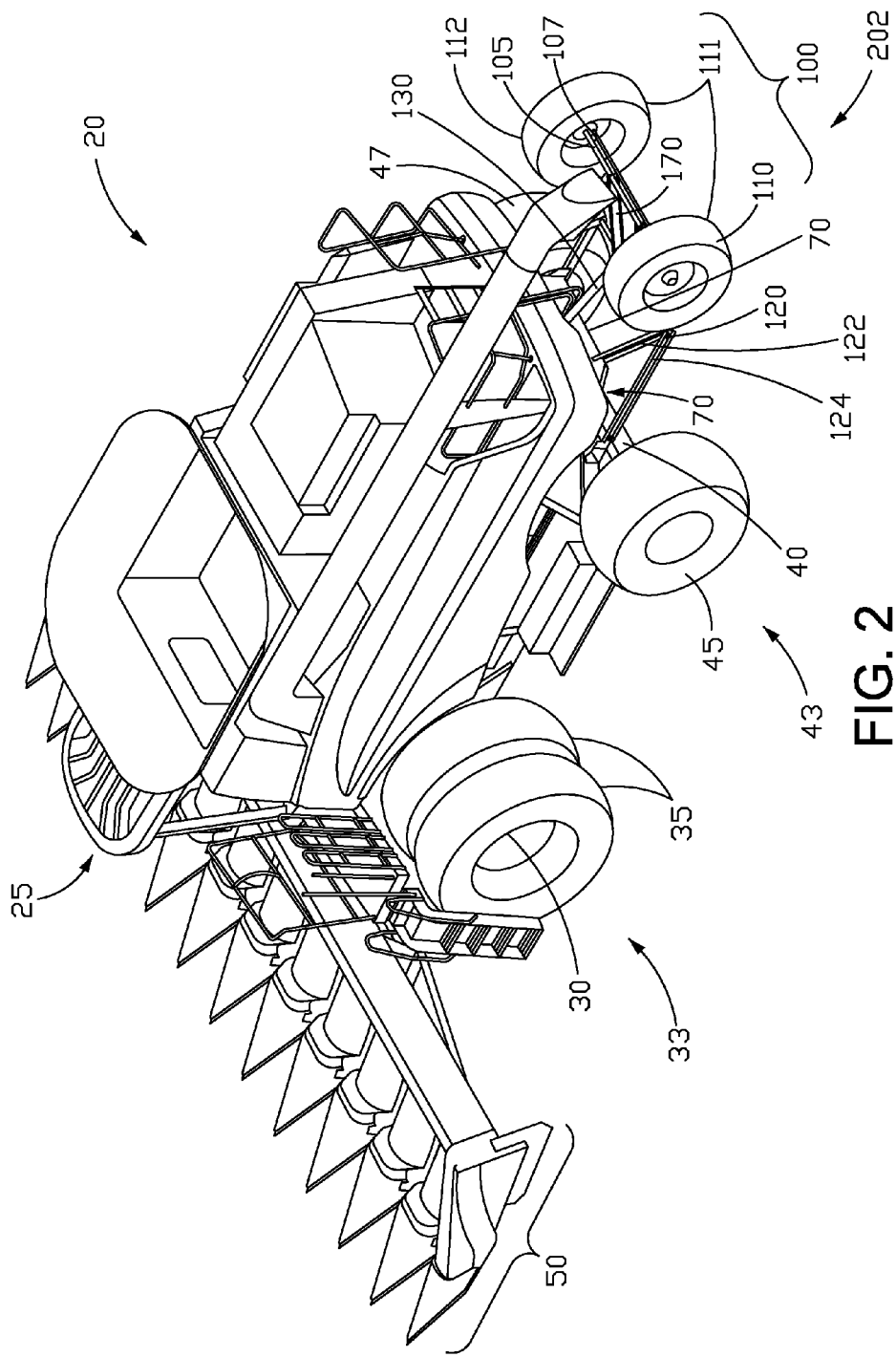
FIG. 2 illustrates a rear isometric perspective view of the harvester with an attached header and an integrated tag axle assembly with tag tires positioned off the ground according to one embodiment of the present invention.

Attached to the harvester under-body 70 at approximately the front of the harvester is the feeder 60. The feeder 60 connects to the header 50 about the feeder housing 65, whereupon the crop can advance through the header 50 and into the feeder 60 of the combine. The feeder 60 may also connect with the header 50 about other various connection points. Headers may be of various sizes and shapes. The header may be a "standard" header, or grain header, used for many crops including: grain; legumes; and many seed crops. The header 50 may also be: a wheat header; a dummy header or pickup header; a specialized corn header; a row crop header; etc. The header shown in both FIG. 1 and FIG. 2 is a corn header. The headers may all be interchangeable and made to fit the feeder 60 about the feeder housing 65. The header 50, such as a corn header, may be removed from the front of the harvester 20 because it is too wide to fit the width of the road or lane of a road for an operator to drive the harvester 20 legally and/or safely.

As shown in FIG. 1, a tag axle assembly 100 may be attached at approximately near the rear of the harvester 20. From the side view perspective of FIG. 1, only one of two tag tires 111 are shown (i.e. the left tag tire 110). Ends of tag axle 105 connect at the centers of the tag tires 111, and is shown extending centrally through left tag tire 110. The tag tires 111 are connected to the tag axle 105 so that the tag tires 111 are capable of spinning simultaneously with the rotation of the tag axle 105 or capable of spinning about the tag axle 105 if the tag axle 105 does not rotate. Also shown in the tag axle assembly 100 is a left actuator cylinder 130. A left pivot member 140 is shown connected with left upper rigid member 122 and left lower rigid member 124 about a left pivot axle 126 (end of left pivot axle 126 shown) about a left pivot joint 120. Both the left upper rigid member 122 and left lower rigid member 124 are shown attached to the harvester under body 70.

The tag axle assembly 100 is shown in a tag axle up position 202. The tag axle assembly 100 may be positioned in the tag axle up position 202 or any other position in which the tag tires 111, left tag tire 110 and right tag tire 112 (see FIG. 2), are not in contact with the ground while the header 50 is attached at the front of the harvester 20. The tag axle up position 202 may be considered a storage position for the tax axle 105, until the tax axle 105 is commanded down and in which the tag tires 111 contact the surface of the ground.

Weight on the rear tires of the rear wheels 43 counteracts the weight in the front of the harvester 20 loaded due to the header 50. The tag tires 111, in the tag axle assembly 100, may be positioned to contract the ground, to thus redistribute weight loaded about the rear wheels 43 and rear axle 40 when the header 50 is removed or a lighter header 52 (see FIG. 10) replaces header 50.

FIG. 2 illustrates a rear isometric perspective view of the harvester 20 with an attached header 50 and an integrated tag axle assembly 100 with tag tires 111 positioned off the ground according to one embodiment of the present invention. As shown in FIG. 2, left front tire 35 may be a pair of left front tires 35. A corresponding pair of right front tires (not shown) is attached to the front axle 30 running from the left to the right side of the harvester 20 on the under-side of the harvester 20. The harvester 20 may include one or more left front tires 35 and a corresponding number of right front tires (not shown). Rear axle 40 is shown running under the harvester under-body 70 connecting left rear tire 45 with right rear tire 47. Left rear tire 45 and right rear tire 47 may be commanded by the operator from cabin 25 to steer the harvester 20 left or right.

As shown in FIG. 2, header 50 represents a corn header. The width of the header 50 may extend beyond the width of the harvester 20, as shown in FIG. 2. The header may weigh 3,000 to over 15,000 lbs.

The tag axle assembly 100, is shown in FIG. 2, with both the left tag tire 110 and right tag tire 112 connected via the tag axle 105 and tie rod 107. Left tag tire 110 and right tag tire 112 rotate about and/or with tag axle 105 extending between both tag tires 111. Opposing ends of the tag axle 105 are shown extending through the center of left tag tire 110 and right tag tire 112. Tie rod 107 connects to wheels internal to both tag tires 111 to ensure that left tag tire 110 and right tag tire 112 spin simultaneously relative to one another. As shown in the present embodiment, the left tag tire 110 and right tag tire 112 are designed with caster so that the tag tires 111, left tag tire 110 and right tag tire 112, self align and track as necessary when the harvester 20 enters a steered condition for changing the forward condition of travel. Caster designed tag tires 111 may follow the harvester 20 so that they may not skid, thus causing wear on each of the tag tires 111. Because the tag tires 111 are located behind the rear wheels 43, steering the harvester 20, the tag tires 111 do not interfere with the steered direction of the harvester 20. In other embodiments, additional tag tires 111 or other pairs of tag tires 111 may be added to the single pair shown in FIG. 2. In other embodiments, the tag tires 111 may not be designed to caster or a tie rod may not be incorporated. In other embodiments, tag tires of various diameters may be incorporated into the tag axle assembly 100. Various diameter tag tires may be utilized to compensate for weight redistribution from the rear wheels 43 when the header 50 is removed. In some embodiments, the tag axle 105 may be affixed to the tag tires 111 so as to spin with the tag tires 111 and so that the tag axle 105 may rotate freely within connection to pivot members and/or actuating cylinders (see FIG. 4). In other embodiments, the tag axle 105 may be affixed in connection with the pivot members and/or actuating cylinders (see FIG. 4), so that the tag tires 111 spin about connection with the tag axle 105, but the tag axle 105 does not rotate.

Left lower rigid member 124 and left upper rigid member 122, in the tag axle assembly 100, are shown in connection with the harvester under-body 70. Right lower rigid member 154 (see FIG. 3) and right upper rigid member 152 (see FIG. 3) are also connected to the harvester under-body 70. The rigid members may be connected with the harvester under-body 70 through a pin and lock system, by connection with a hook, or by any other means to allow for the removal and installation of the tag axle assembly 100 with the harvester 20. The type of rigid members connection with the harvester under-body 70 may allow for easy attachment and removal of the tag axle assembly 100 by an operator. The rigid members may also be more permanently connected to the harvester under-body 70 by being welded, bolted, or connected via some other permanent means to the harvester under-body 70. Thus, the tag axle assembly 100 may either be a removable or a permanently mounted device from on or about the harvester 70. A permanently mounted tag axle assembly 100 may be stored in the tag axle up position 202, as shown in FIGS. 1 through 4, when not used to absorb weight from the rear wheels 43 of the harvester 20 when the header 50 is removed. In other embodiments, the rigid members may be connected at other various locations on the harvester 20, other than the harvester under body 70.

Figure 3:
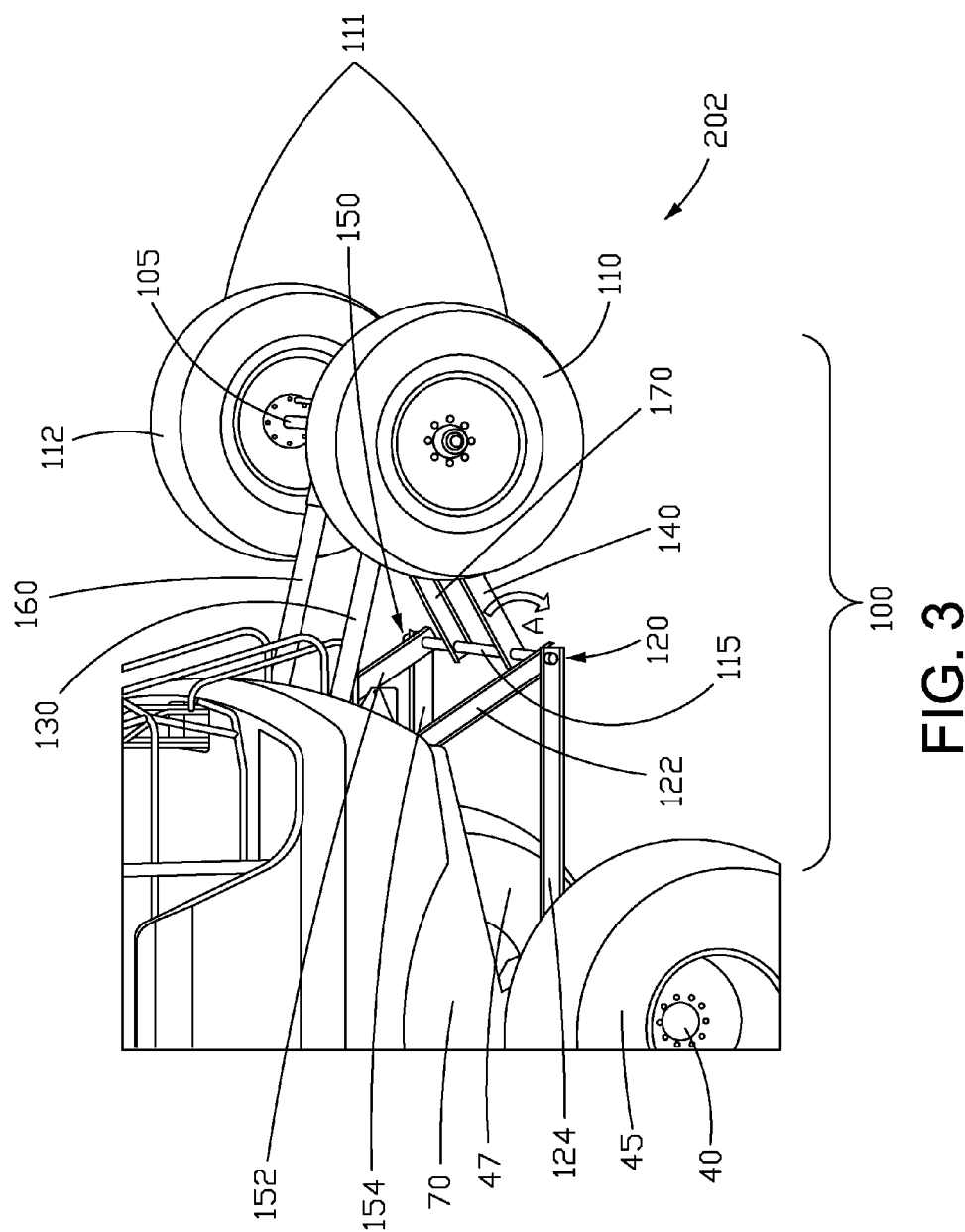
FIG. 3 illustrates a close-up side view of the tag axle assembly with the tag tires positioned off the ground according to one embodiment of the present invention.

FIG. 3 illustrates a close-up side view of the tag axle assembly 100 with the tag tires 111 positioned off the ground according to one embodiment of the present invention. Pivot rod 115 is shown in FIG. 3 running from left lower rigid member 124 and left upper rigid member 122 to right lower rigid member 154 and right upper rigid member 152. Rigid members may be fixed in position and may not otherwise move or rotate. Both the left lower rigid member 124 and left upper rigid member 122 are connected to the pivot rod 115 at left pivot joint 120 and in proximity to one another. Both the right lower rigid member 154 and right upper rigid member 152 are connected to the pivot rod 115 at right pivot joint 150 and in proximity to one another. Ends of both left pivot member 140 and right pivot member 170, as visible in FIG. 3, are connected about pivot rod 115. The left pivot member 140 and right pivot member 170 are affixed to the pivot rod 115 so that as the pivot rod 115 rotates, both the left pivot member 140 and right pivot member 170 move in turn with the pivot rod 115 from the connection about the circumference of the rotating pivot rod 115.

The connection of the pivot rod 115 to the rigid members allow for the pivot rod 115 to rotate about and within the connections to the rigid members. The rigid members remain stationary about their fixed connection with the harvester under-body 70. However, the pivot rod 115 is free to rotate in clockwise direction A, resulting in the movement of the pivot members and the various connected components to the tag tires 111, from a tag axle up position 202 to any position between and including the tag axle down position 212 (see FIG. 5). The pivot rod 115 may also rotate counter clockwise opposite direction A from the tag axle down position 212 (see FIG. 5) to any position between and including the tag axle up position 202. The pivot rod 115 may stop rotating so that the tag tires 111 are held in position at any location between and including the tag axle up position 202 and a tag axle down position 212 (see FIG. 5).

In some embodiments, only one upper and lower rigid member may be integrated to hold the pivot rod, so that the pivot rod 115 rotates in only one pivot joint between the two rigid members. In other embodiments, only one rigid member extending from connection with the harvester under-body 70 may be connected to hold the pivot rod 115. With only one pivot joint, the connection between the pivot rod 115 and a rigid member(s) may be located approximate to the center of the pivot rod 115. In other embodiments, many more rigid members may be attached to the harvester under-body 70 and connected to the pivot rod 115.

Figure 4:
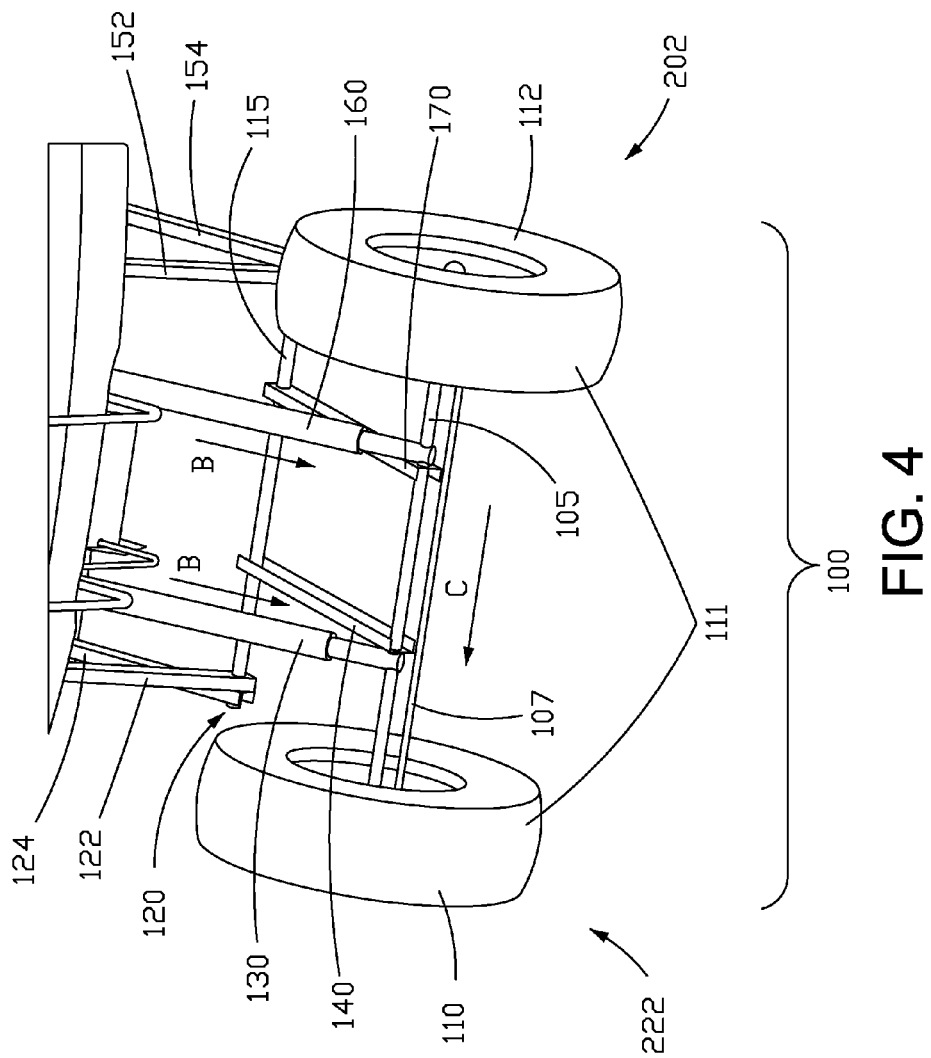
FIG. 4 illustrates a close-up rear view of the tag axle assembly with the tag tires positioned off the ground according to one embodiment of the present invention.

Connection of left pivot member 140 and right pivot member 170 to the tag axle 105 is shown in FIG. 4. Left pivot member 140 and right pivot member 170 rotating about the circumference of the pivot rod 115, as the pivot rod 115 rotates in direction A or opposite direction A, moves up or down the tax axle 105 which is connected to ends of the left pivot member 140 and right pivot member 170, opposing the ends connected with the pivot rod 115. In other embodiments, only one pivot member, as opposed to a left pivot member 140 and right pivot member 170, may be connected at one end to the pivot rod 115 and at the other end to the tag axle 105. In other embodiments, three or more pivot members may be connected between the pivot rod 115 and tag axle 105.

FIG. 4 illustrates a close-up rear view of the tag axle assembly 100 with the tag tires 111 positioned off the ground according to one embodiment of the present invention. A left actuating cylinder 130 and right actuating cylinder 160 are shown connected to the tag axle 105 in FIG. 4. The actuating cylinders may be a linear actuator. The actuating cylinder may be a hydraulic actuator, an electro-mechanical actuator, a mechanical actuator, a pneumatic actuator, and/or any other type of actuator. The left actuating cylinder 130 and right actuating cylinder 160 may be hydraulic cylinders that enlarge and shrink in length due to the extension and retraction of a hydraulic piston within each cylinder. Extending the left actuating cylinder 130 and right actuating cylinder 160 in direction B forces or pushes the tag axle down moving about the pivot rod 115 in direction A (see FIG. 3), so that the tag assembly 100 moves towards tag down position 212 (see FIG. 5). Retracting the left actuating cylinder 130 and right actuating cylinder 160 opposite direction B forces or pulls the tag axle up and away from the ground, driving the pivot rod 115 to rotate opposite direction A (see FIG. 3), so that the tag assembly 100 moves towards tag up position 202.

The upper ends of the left actuating cylinder 130 and right actuating cylinder 160 are connected to the harvester 20. Hydraulic and/or electrical connections are routed throughout the harvester 20 and to the cabin 20 where an operator may control the extension and retraction of left actuating cylinder 130 and right actuating cylinder 160. The operator may control the tag axle assembly 100 by extending/retracting the actuating cylinders so as to position the tag axle assembly 100 at any position at or between a tag axle up position (see FIG. 1) and the tag axle down position (see FIG. 5). At the tag axle down position (see FIG. 5), the tag axle may bear load from the back of the harvester 20 with the tag tires 111 in contact with the ground. The operator may choose a position to set the tag axle 105 and tag tires 111 to adjust for a particular amount of weight to offload from the rear axle 40. For example, the operator may extend the tag axle 105 and tag tires 111 down near the surface of the ground, but not touching the ground to shift some weight further to the rear of the harvester, but to not necessarily induce loads onto the tag tires 111. The cabin 20 may include a lever, button, switch, touch display, or any other control device so that the operator may raise or lower the tag assembly 100. In other embodiments, only one hydraulic cylinder may be integrated into the tag assembly 100, as opposed to the two shown in FIG. 4. In other embodiments, three or more actuators may be integrated. In other embodiments, a mechanical means of raising and lowering the tag assembly 100, as an alternative to or in addition to the actuating cylinders may be integrated. The mechanical means may include a lever, elevator, chain, or other means so that the operator can raise or lower the tag assembly 100 from inside or outside the cabin. Other control means for raising or lowering the tag assembly 100 may be located inside the cabin 25 or elsewhere within our outside the harvester 20. Actuating cylinders may be permanently attached to the tag assembly 100 or may be detached from connection with the tag axle 105, but permanently attached to the harvester 20 so that at least a portion of the tag assembly 100 may be removed or installed.

Figure 8:
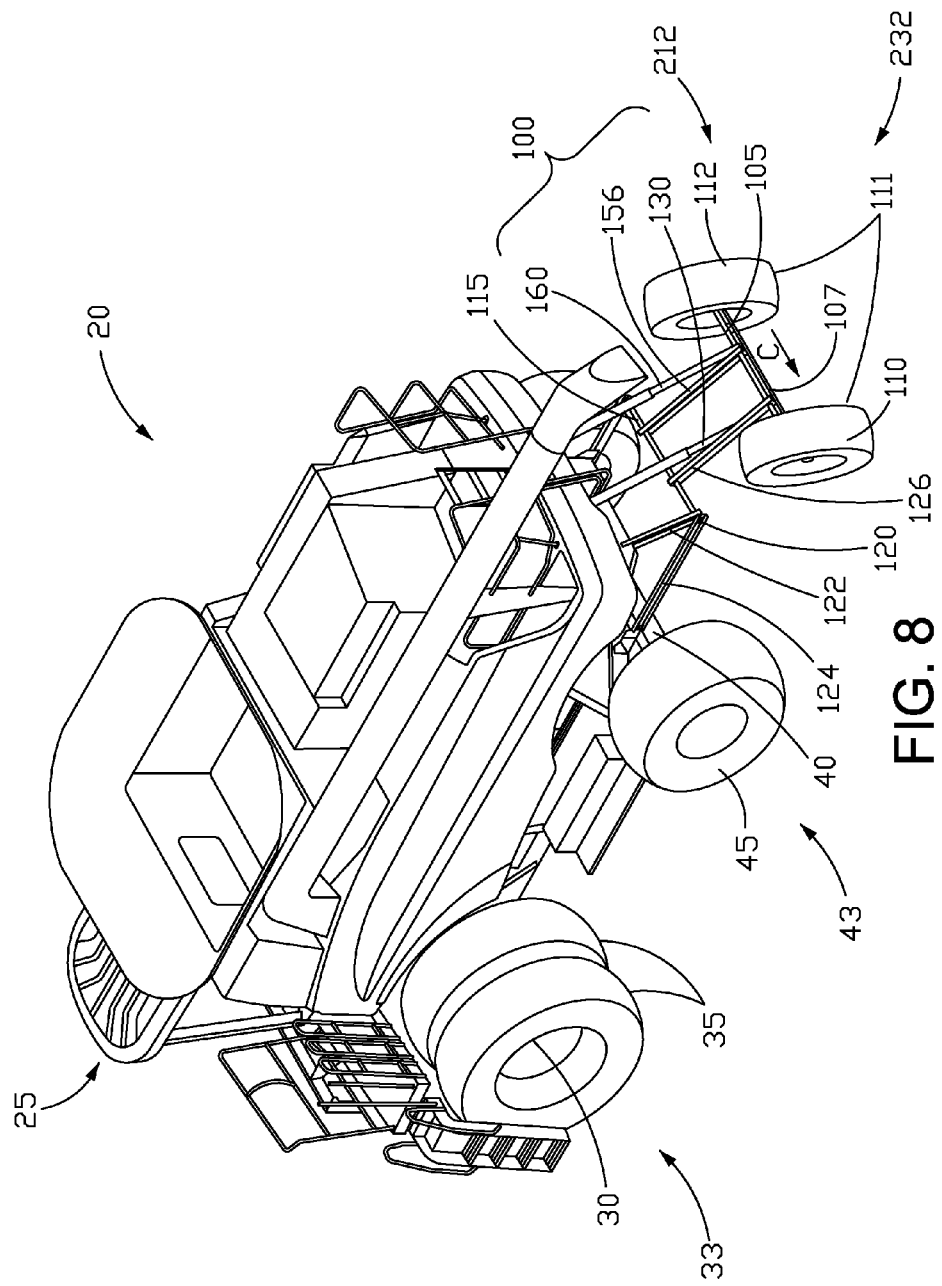
FIG. 8 illustrates a rear isometric perspective view of the harvester with an unattached header and an integrated tag axle assembly with tag tires positioned on the ground and shifted in direction according to one embodiment of the present invention.

Based on the caster design for the tag tires 111, if the harvester 20 is steered to the left, the left tag tire 110 and right tag tire 112 would shift in direction C as shown in FIG. 8, so that the front of the tag tires 111 closest to the harvester 20 would point further right than the rear of the tag tires 111. If the harvester 20 is steered to the right, the left tag tire 110 and right tag tire 112 would shift opposite direction C, so that the front of the tag tires 111 closest to the harvester 20 would point further left than the rear of the tag tires 111. Tag tires 111 caster, or swivel freely, in following the steering of the harvester 20.

Figure 5:
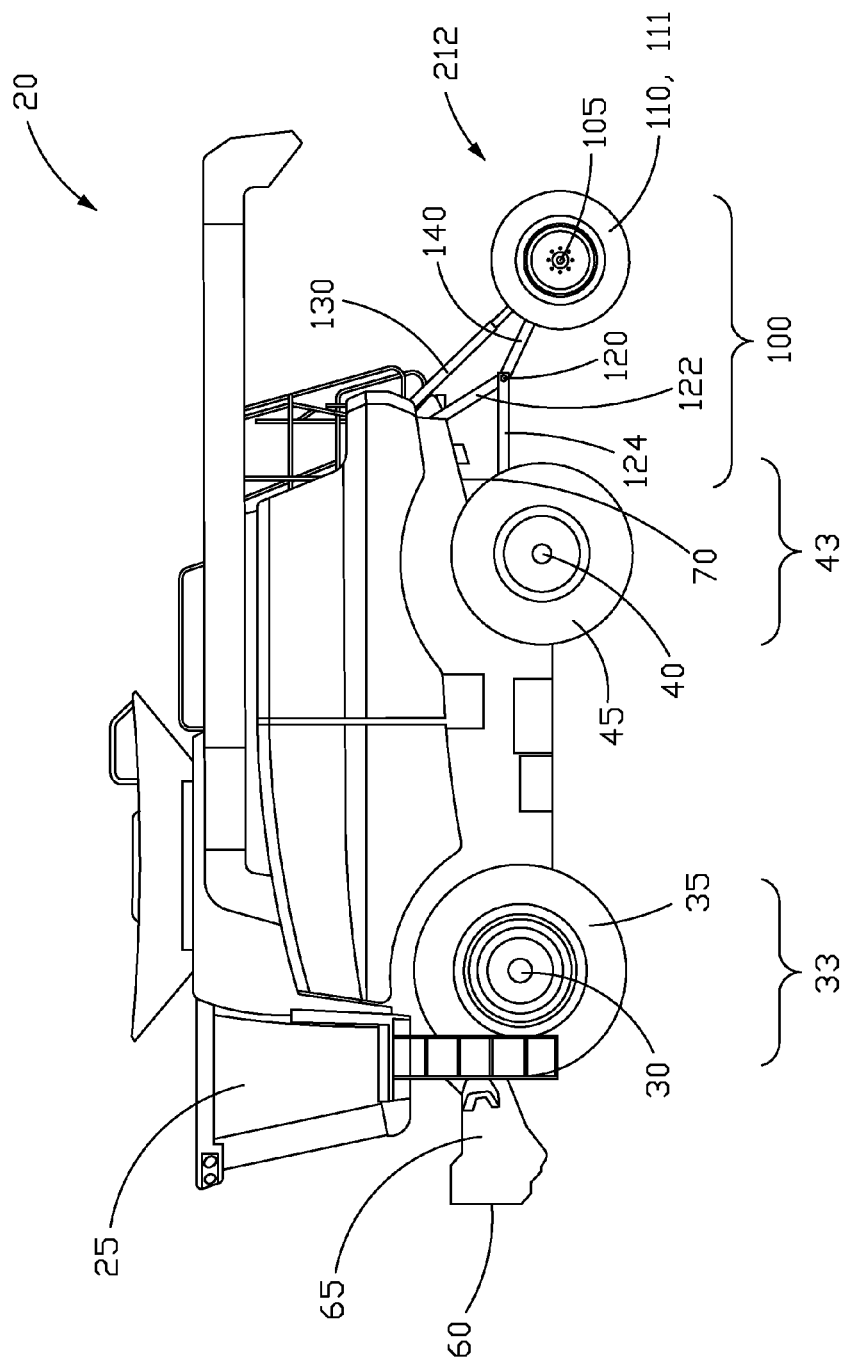
FIG. 5 illustrates a side view of the harvester with an unattached header and an integrated tag axle assembly with tag tires positioned on the ground according to one embodiment of the present invention.

FIG. 5 illustrates a side view of the harvester 20 with an unattached header and an integrated tag axle assembly 100 with tag tires 111 positioned on the ground according to one embodiment of the present invention. As shown in FIG. 5, header 50 (see FIG. 1) is removed from the feeder 60 about connection with the feeder housing 65. The header 50 may be removed to allow for the installation of another type or size header. The header 50 may also be removed for road and/or field-to-field transport of the harvester 20, driven by an operator. With the header 50 removed, weight is shifted to the rear axle 40 and rear wheels 43. The shifted weight to the rear axle 40 may potentially create increased steering effort on the steering rear wheels 43, and/or tire overloading conditions on the rear wheels 43. Only left rear tire 45 of the rear wheels 43 is shown in side view of the harvester 20 in FIG. 5.

In the tag down position 212, left tag tire 110 and right tag tire 112 (see FIG. 6) absorb some of the weight redistributed from the front of the harvester 20 to the rear axle 40 when the header 50 is removed. The operator may lower the tag axle 105 so that the left tag tire 110 and right tag tire 112 (see FIG. 6) contact the surface of the ground to absorb loading transitioned to the rear of the harvester 20. As shown in FIG. 5, the left actuating cylinder 130 and right actuating cylinder 160 (see FIG. 6) are extended so that the tax axle 105 is located at the tag down position 212 with the tag tires 111 in contact with the ground.

Figure 6:
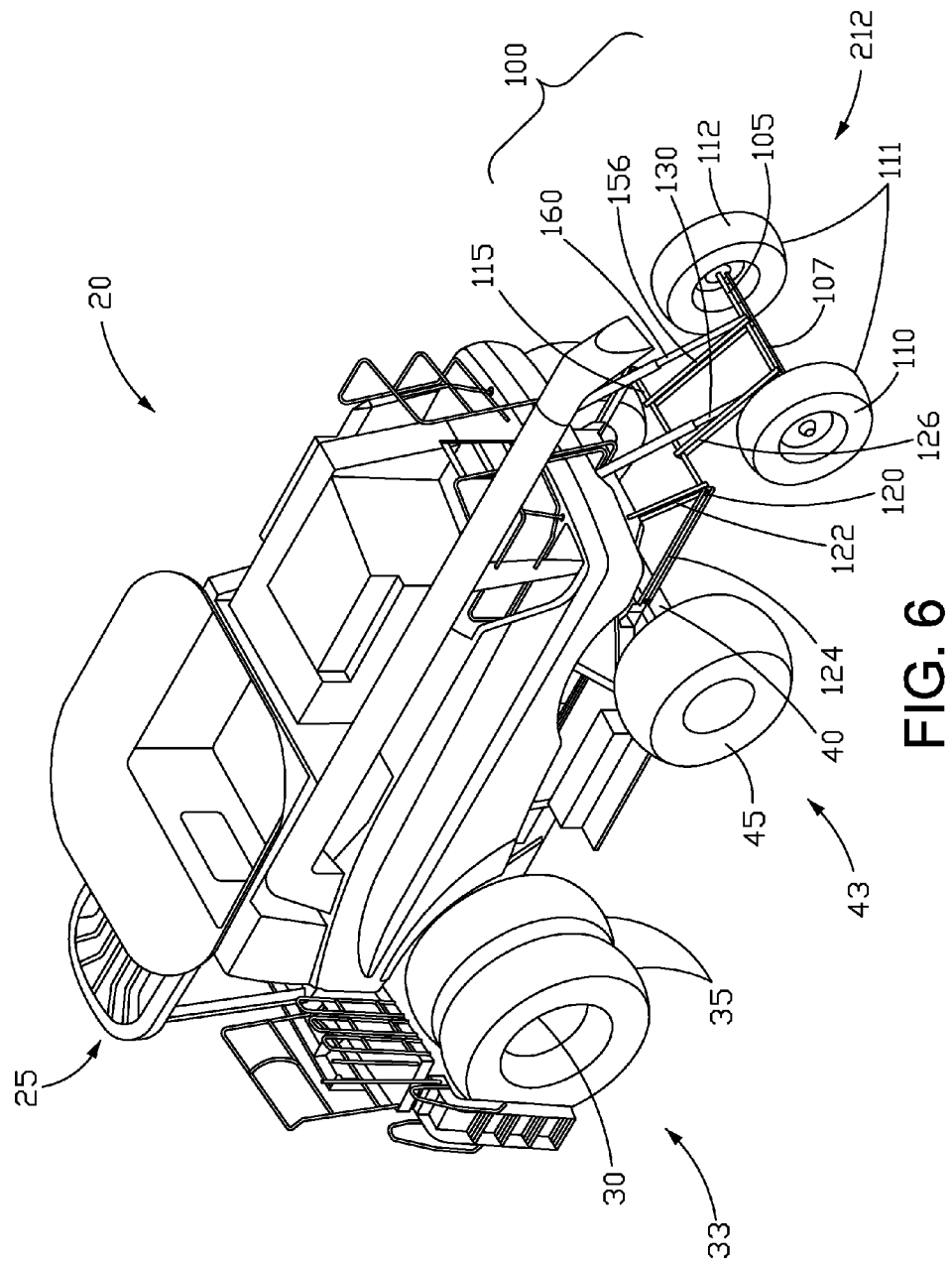
FIG. 6 illustrates a rear isometric perspective view of the harvester with an unattached header and an integrated tag axle assembly with tag tires positioned on the ground according to one embodiment of the present invention.

FIG. 6 illustrates a rear isometric perspective view of the harvester 20 with an unattached header and an integrated tag axle assembly 100 with tag tires 111 positioned on the ground according to one embodiment of the present invention. The harvester 20 with the tag tires 111 in the down position, shown from the side in FIG. 5, is shown in FIG. 6 such that both the left tag tire 110 and right tag tire 112 are visibly shown in contact with the ground. Also, both the left actuating cylinder 130 and right actuating cylinder 160 are visibly shown extended placing the tag axle 105 in the tag down position 212 so that the tag tires 111 may absorb weight from the rear axle 40, redistributed from the front of the harvester 20.

Figure 7:
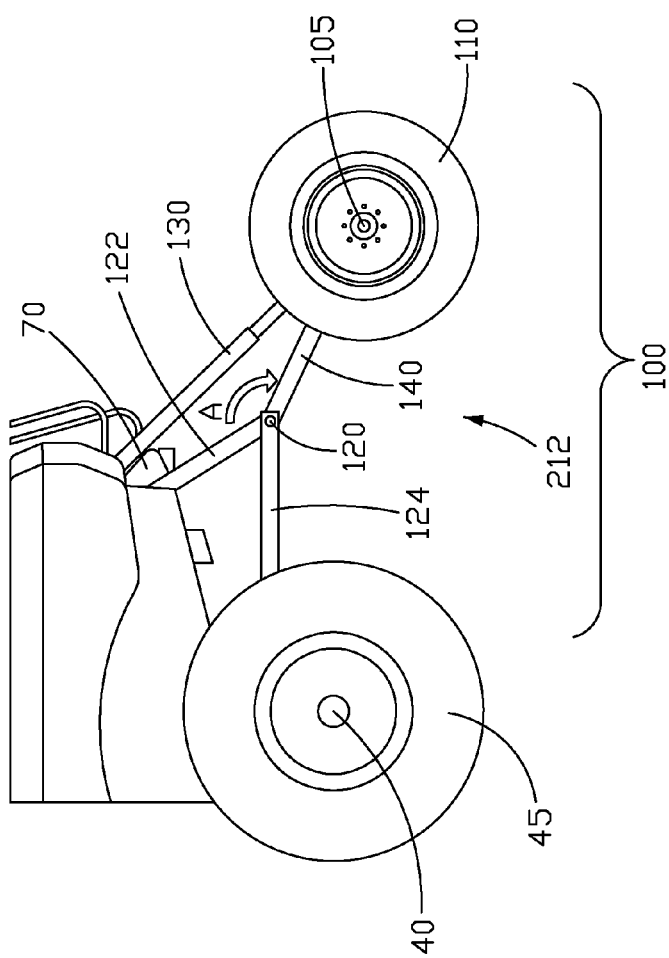
FIG. 7 illustrates a close-up side view of the tag axle assembly with tag tires positioned on the ground according to one embodiment of the present invention.

FIG. 7 illustrates a close-up side view of the tag axle assembly 100 with tag tires 111 positioned on the ground according to one embodiment of the present invention. As shown in FIG. 7, left pivot member 140, and thus right pivot member (not shown), is shown in a lowered position having rotated in direction A from the tag axle up position shown in FIG. 3. Left actuating cylinder 130, and thus right actuating cylinder (now shown), is shown extended.

FIG. 8 illustrates a rear isometric perspective view of the harvester 10 with an unattached header and an integrated tag axle assembly 100 with tag tires 111 positioned on the ground and shifted in direction according to one embodiment of the present invention. As shown in FIG. 8, left tag tire 110 and right tag tire 112 are shifted in direction C with the front of the tag tires 111 facing to the right of the harvester 20 in tag tire forward facing right position 232.

Figure 9:
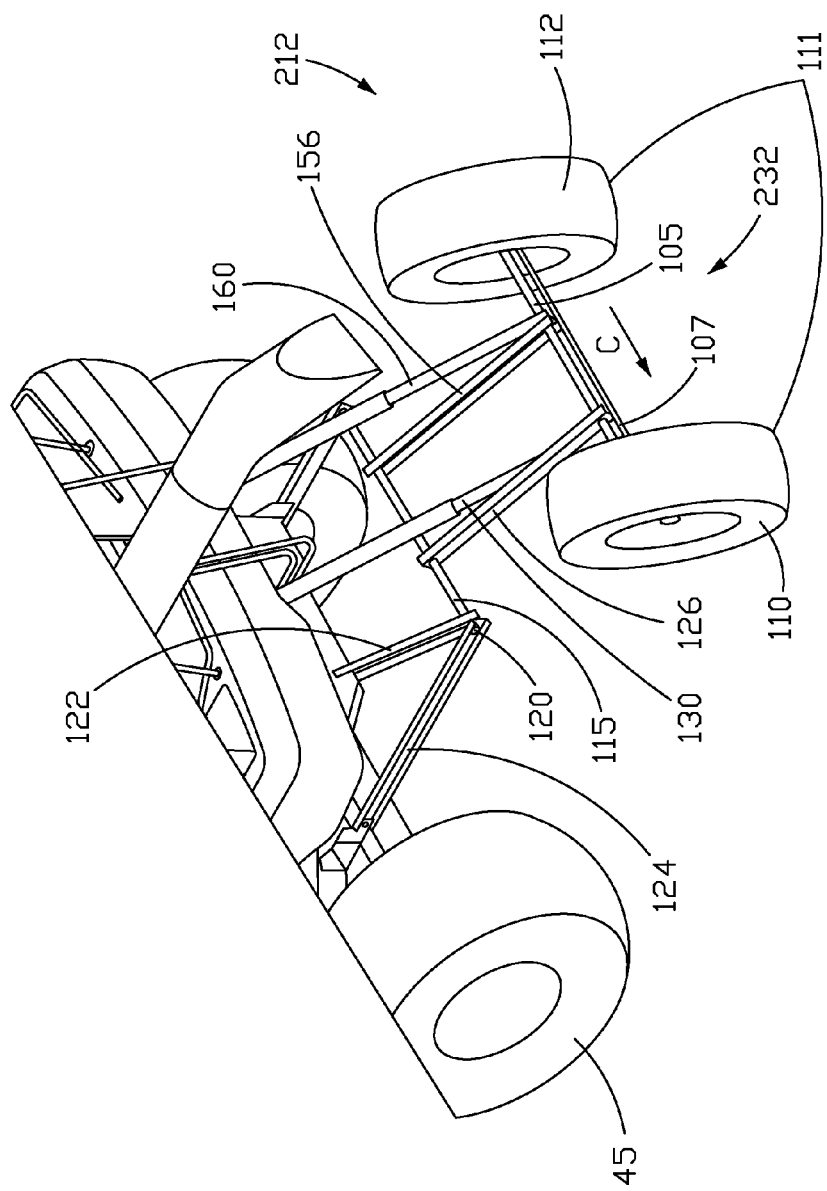
FIG. 9 illustrates a close-up rear view of the tag axle assembly with tag tires positioned on the ground and shifted in direction according to one embodiment of the present invention.

FIG. 9 illustrates a close-up rear view of the tag axle assembly 100 with tag tires 111 positioned on the ground and shifted in direction according to one embodiment of the present invention. As shown in the close-up view of FIG. 9, the left tag tire 110 and right tag tire 112 are connected via tie rod 107. Tie rod 107 may control the relative position of the left tag tire 110 and right tag tire 112 to each another while tag tires 111 are turning. Left tag tire 110 and right tag tire 112 may shift left or right in or opposing to direction C based on the steering direction of the harvester 20 as driven by the operator.

Figure 10:
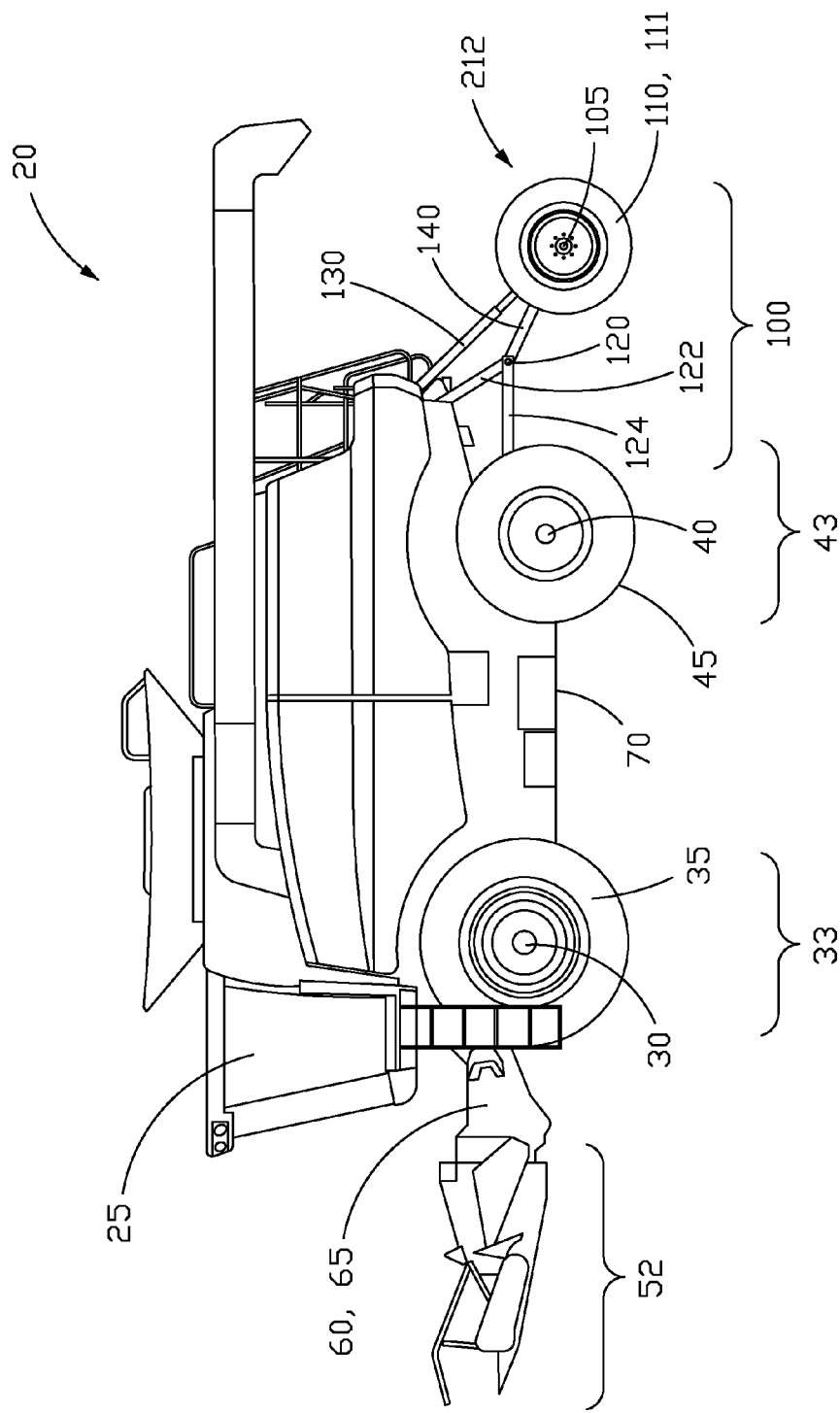
FIG. 10 illustrates a side view of the harvester with an attached light header and an integrated tag axle assembly with tag tires positioned on the ground according to one embodiment of the present invention.

FIG. 10 illustrates a side view of the harvester 20 with an attached light header 52 and an integrated tag axle assembly 100 with tag tires 111 positioned on the ground according to one embodiment of the present invention. A light header 52 is any type, size, or weight header that when attached to the harvester 20 does not balance loads to the front of the harvester 20 with loads at the rear of the harvester 20 so that they may become destructive to the rear axle 40 and rear wheels 43, and thus requires utilization of the tag axle 105 and tag tires 111 to offset weight from onto the rear axle 40 and rear wheels 43. A light header 52 may include small heads for simply cutting crop so that the crop lays down in a windrow. In the event that a lighter header 52 is attached to the harvester 20, as opposed to a heavier header such as header 50 (see FIG. 1 and i.e. a corn header), the tag axle 105 (see FIG. 11) with tag tires 111 may need to be lowered to absorb weight applied on the rear tag axle 40 and rear wheels 43. The tag axle 105 may be lowered to a tag down position 212, in which the left tag tire 110 and right tag tire (not shown) contact the ground similar to when the harvester 20 has an unattached header (see FIG. 5).

Figure 11:
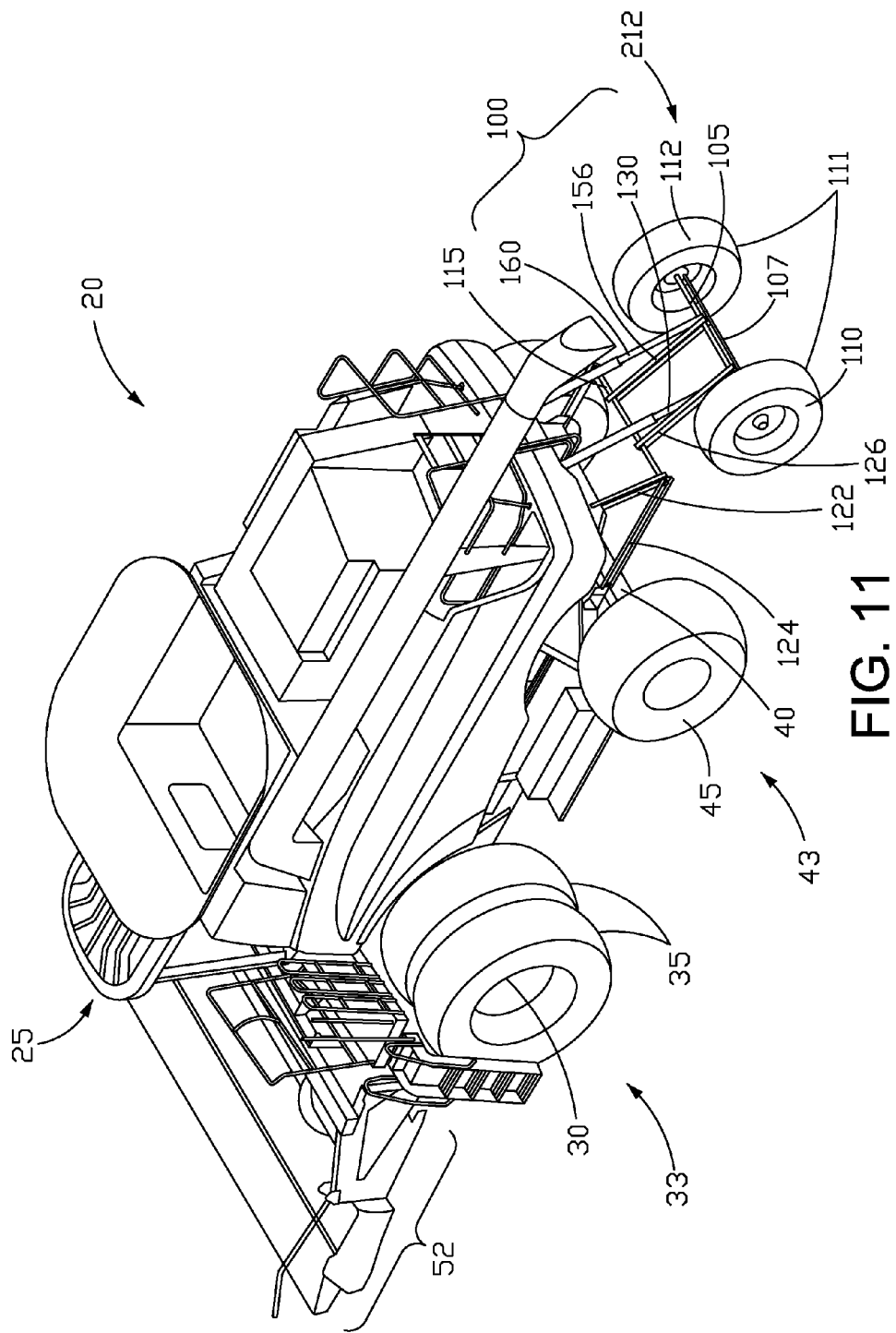
FIG. 11 illustrates a rear isometric perspective view of the harvester with an attached light header and an integrated tag axle assembly with tag tires positioned on the ground according to one embodiment of the present invention.

FIG. 11 illustrates a rear isometric perspective view of the harvester 20 with an attached light header 52 and an integrated tag axle assembly 100 with tag tires 111 positioned on the ground according to one embodiment of the present invention. As shown in FIG. 11, light header 52 is smaller in width than the header 50, shown in FIG. 2. Light header 52 is also lighter in weight than header 50, shown in FIG. 2. Width and weight of a header may not be mutually exclusive. A smaller width header may be just as heavy or more heavy than a larger width header. The various differences in header weights may be due to composition of materials in the header and or the number of components in the header. The tag tires 111 are shown forward facing and not turned in any particular direction.

Figure 12:
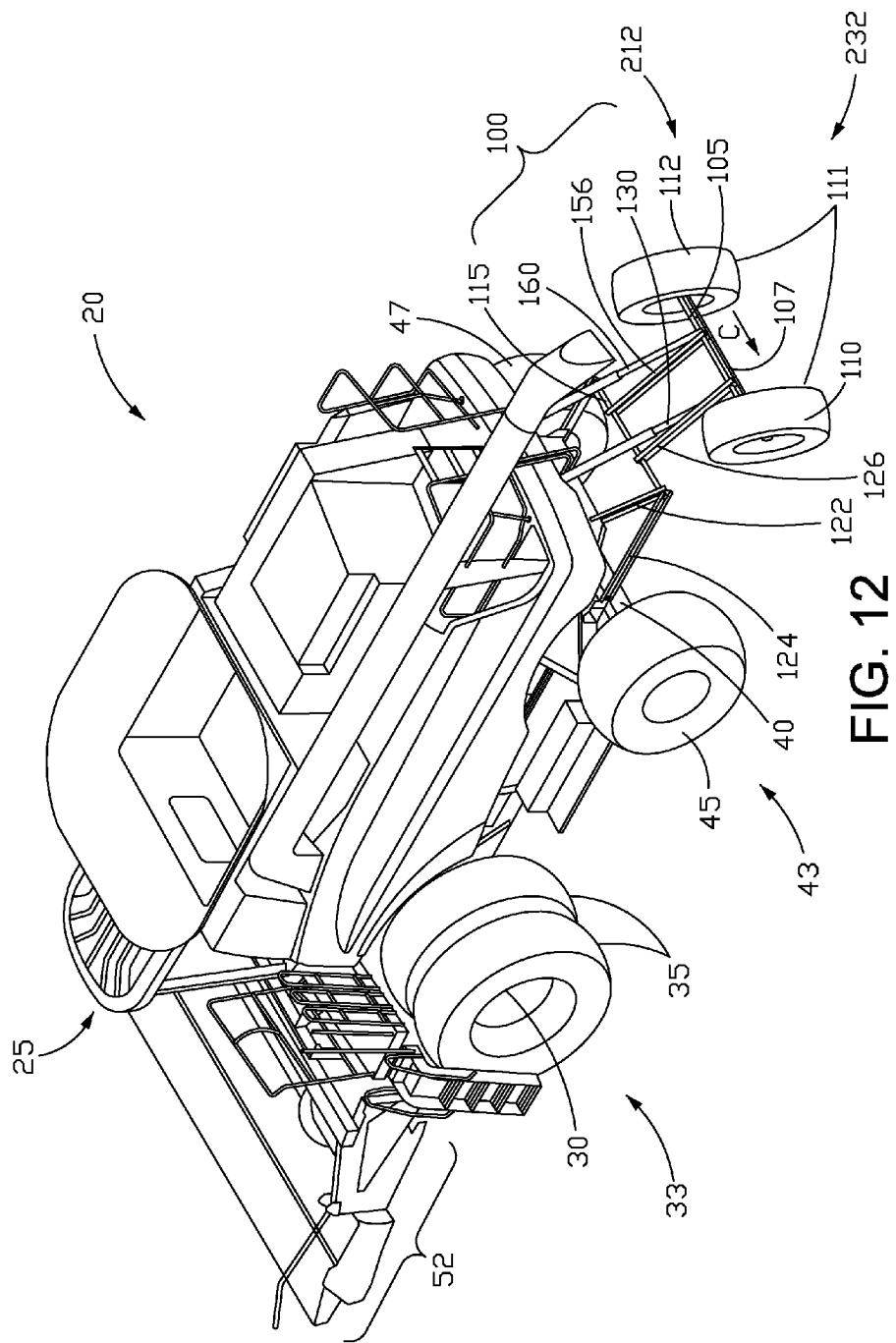
FIG. 12 illustrates a rear isometric perspective view of the harvester with an attached light header and an integrated tag axle assembly with tag tires positioned on the ground and shifted in direction according to one embodiment of the present invention.

FIG. 12 illustrates a rear isometric perspective view of the harvester 20 with an attached light header 52 and an integrated tag axle assembly 100 with tag tires 111 positioned on the ground and shifted according to one embodiment of the present invention. FIG. 12 shows the tag axle assembly 100 at tag down position 212 to compensate for loads imposed onto the rear axle 40 and rear wheels 43 with the addition of the light header 52. Left tag tire 110 and right tag tire 112 are shown shifted to tag tire forward facing right position 232 as if the harvester 20 is being steered to the left by an operator within the cabin 25. If the operator drives the harvester 20 to steer left then the caster designed tag tires 111 will follow along shifted in direction C to the tag tire forward facing right position 232.

In other embodiments, additional tag tires may be added to tag axle 105, along with left tag tire 110 and right tag tire 112, to further absorb weight from the rear axle 40. In other embodiments, one tag tire as opposed to a left tag tire 110 and a right tag tire 112 may be utilized in the tag axle assembly 100. A single tag tire may be centralized on the tag axle 105. In other embodiments, additional tag axles may be connected in parallel to tag axle 105 by extension rods connecting the tag axle 105 to an additional axle and an additional axle to another additional axle to thus resemble a train of multiple tag axles, with one or more tag tires 111 connected to each tag axle. In other embodiments, tag tires 111 may vary in size. Tag tires 111 may be larger, having larger diameters, and/or wider, having larger tire surface area, so as to absorb more weight at the rear of the harvester 20. Tag tires 111 may include various types of tread for traction. Thus, an operator may replace a tag tire with particular tread with a tag tire of another particular tread to provide for increased traction, in for example from dry weather road surfaces to wet weather muddy field surfaces.

In other embodiments, ballasts may be integrated into the tag axle assembly 100, to provide additional weight to the tag axle assembly 100 to thus absorb weight from off the rear axle 40. Ballasts may be attached to the left tag tire 110, right tag tire 112, tag axle 105, tie rod 107, any rigid member, and/or any pivoting member in the tag axle assembly 100. Other various types of weights, such as suitcase weights may be added to the tag axle assembly 100. Fluid, such as calcium chloride may be introduced into the tag tires 111 to provide for added weight to the tag axle assembly 100. The tag axle assembly 100 may also be utilized in conjunction with various weights and/or fluids applied to the rear axle 40 and/or rear wheels 43.

In other embodiments, the tag axle assembly 100 may be attached by an operator to the harvester 20 when a header is to be removed or may be replaced by a lighter header. If the tag axle assembly 100 is attached only in these instances or instances of the like, then the tag axle assembly 100 may not need the means or configuration to raise up from contact between the tag tires 111 and the ground. Thus a tag axle assembly 100 may include one or more rigid members extending from connection with the harvester under-body 70 and connected directly to the tag axle 105 and/or one or more of the tag tires 111, wherein the connection to the tag axle 105 and/or one or more of the tag tires 111 allows for the tag axle 105 and tag tires 111 to rotate freely. In this embodiment, the one or more tag tires 111 still support weight redistribution and reduce load on the rear axle 40 and rear wheels 43.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A harvester comprising:
a feeder connected at approximately a front end of the harvester, wherein the feeder comprises a connection point for a header to attach;
at least one pair of front wheels, wherein each front wheel of the at least one pair are connected to opposing ends of a front axle for supporting loads about the front end of the harvester with the front wheels in contact with a ground surface; the front axle to serve as an axis that balances a moment of force that is exerted by the header; a replacement of the header with a light header reduces the moment of force around the axis,
at least one pair of rear wheels, wherein each rear wheel of the at least one pair are connected to opposing ends of a rear axle for supporting loads about a rear end of the harvester with the rear wheels in contact with the ground surface;
a tag axle assembly comprising:
one or more rigid members connected approximately near to the rear end of the harvester;
a tag axle connected to the one or more rigid members; and
one or more tag tires connected about the tag axle to rotate in connection with the tag axle, wherein the one or more tag tires contact the ground surface to support loads about the rear end of the harvester upon replacement of the header with the light header; and
an actuator that offloads a particular weight from the rear axle, that is adjustable based on a position of the tag axle as set by an operator.

2. The harvester of claim 1, wherein the tag axle assembly further comprises:
a pivot rod connected to the one or more rigid members wherein the pivot rod is free to rotate within the connection to the one or more rigid members;
one or more pivot members connected to the pivot rod and to the tag axle, wherein the pivot members rotate from the connection with the pivot rod in the direction of rotation of the pivot rod; and
one or more actuating cylinders associated with the actuator and further connected at one end to a control device in the harvester for controlling extension and retraction of the one or more actuating cylinders and connected at another end to the tag axle; wherein when the one or more actuating cylinders are retracted, the one more actuating cylinders pull the tag axle away from the ground surface with the one or more pivot members rotating in direction of the pivot rod to allow for the tag axle to raise up and wherein when the one or more actuating cylinders are extended, the one or more actuating cylinders push the tag axle towards the ground surface with the one or more pivot members rotating in opposite direction with the pivot rod to allow for the tag axle to lower down.

3. The harvester of claim 2, wherein the one or more actuating cylinders are selected from a hydraulic actuator, an electro-mechanical actuator, a mechanical actuator, or a pneumatic actuator.

4. The harvester of claim 2, wherein the one or more actuating cylinders are retracted to pull up the tag axle into a position for storage about the rear of the harvester.

5. The harvester of claim 2, wherein the control device is located in a cabin of the harvester and wherein the control device is selected from a lever, button, switch, or touch display to extend and retract the one or more actuating cylinders.

6. The harvester of claim 1, wherein the tag axle assembly further comprises a tie rod connected between two or more tag tires so that the two or more tag tires caster in the direction of travel of the harvester.

7. The harvester of claim 1, wherein the one or more tag tires contact the ground surface to support loads about the rear end of the harvester when a light weight header is attached at the connection point with the feeder.

8. The harvester of claim 1, wherein the header weighs within a range of 3,000 lbs. to 15,000 lbs.

9. The harvester of claim 1, wherein a tag tire of the tag axle assembly has a larger diameter than other tires of the rear axle assembly.

10. The harvester of claim 9, wherein the tag tire with the larger diameter has a larger width than other tires of the rear axle assembly.

11. The harvester of claim 1, wherein the header is a corn header.

\* \* \* \* \*